(12) United States Patent
Fitchett et al.

(10) Patent No.: US 9,757,907 B2
(45) Date of Patent: Sep. 12, 2017

(54) COMPOSITE MOULDING TECHNIQUES

(71) Applicant: Jaguar Land Rover Limited, Whitley, Coventry, Warwickshire (GB)

(72) Inventors: Kelly Fitchett, Calgary (CA); Wendy Eldred, Warwick (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 114 days.

(21) Appl. No.: 14/385,611

(22) PCT Filed: Mar. 18, 2013

(86) PCT No.: PCT/EP2013/055575
§ 371 (c)(1),
(2) Date: Sep. 16, 2014

(87) PCT Pub. No.: WO2013/135911
PCT Pub. Date: Sep. 19, 2013

(65) Prior Publication Data
US 2015/0064410 A1    Mar. 5, 2015

(30) Foreign Application Priority Data
Mar. 16, 2012 (GB) .................................. 1204690.0

(51) Int. Cl.
*B29C 70/44* (2006.01)
*B29C 70/46* (2006.01)
(Continued)

(52) U.S. Cl.
CPC ............ *B29C 70/465* (2013.01); *B29C 43/18* (2013.01); *B29C 43/36* (2013.01); *B29C 70/021* (2013.01);
(Continued)

(58) Field of Classification Search
CPC ......... B29C 70/46; B29C 70/54; B29C 70/14; B29C 70/44; B29C 43/20; B29C 43/206
(Continued)

(56) References Cited

U.S. PATENT DOCUMENTS 4,755,129 A * 7/1988 Baker ..................... B29C 51/32
264/160
5,558,931 A    9/1996 Biggs et al.
(Continued)

FOREIGN PATENT DOCUMENTS

DE            19923480 A1    11/2000
DE          102006040748       3/2008
(Continued)

OTHER PUBLICATIONS

Combined Search and Examination report corresponding to application No. GB1304918.4, dated Sep. 19, 2013, 9 pages.
(Continued)

*Primary Examiner* — Christina Johnson
*Assistant Examiner* — Xue Liu
(74) *Attorney, Agent, or Firm* — Reising Ethington P.C.

(57) ABSTRACT

The present invention relates to a method of molding a component (1) having one or more features (5). At least one fibrous substrate (7) is located in a mold (31, 33). A matrix-forming material (29) is also provided in the mold (31, 33). Heat is applied to melt the matrix-forming material (29) to form a matrix (9) and to integrally mold said one or more features (5).

16 Claims, 10 Drawing Sheets

(51) Int. Cl.
*B29C 70/34* (2006.01)
*B29C 43/18* (2006.01)
*B29C 70/02* (2006.01)
*B29C 43/36* (2006.01)
*B29C 70/14* (2006.01)
*B29C 70/54* (2006.01)
*B29L 31/30* (2006.01)
*B29K 23/00* (2006.01)
*B29K 101/12* (2006.01)
*B29K 105/14* (2006.01)
*B29K 307/04* (2006.01)
*B29L 9/00* (2006.01)

(52) U.S. Cl.
CPC ............ *B29C 70/14* (2013.01); *B29C 70/342* (2013.01); *B29C 70/345* (2013.01); *B29C 70/44* (2013.01); *B29C 70/462* (2013.01); *B29C 70/545* (2013.01); *B29K 2023/12* (2013.01); *B29K 2101/12* (2013.01); *B29K 2105/14* (2013.01); *B29K 2307/04* (2013.01); *B29L 2009/00* (2013.01); *B29L 2031/30* (2013.01); *Y10T 428/24612* (2015.01)

(58) Field of Classification Search
USPC ........................ 264/319, 266, 163, 511, 161
See application file for complete search history.

(56) References Cited

U.S. PATENT DOCUMENTS

| | | | |
|---|---|---|---|
| 5,849,234 | A | 12/1998 | Harrison et al. |
| 5,863,365 | A | 1/1999 | Bird |
| 5,927,778 | A | 7/1999 | Uytterhaeghe |
| 6,017,484 | A | 1/2000 | Hale |
| 2003/0041955 | A1 | 3/2003 | Spengler |
| 2004/0175533 | A1 | 9/2004 | Yamane et al. |
| 2010/0239856 | A1 | 9/2010 | Olson et al. |
| 2012/0148824 | A1 | 6/2012 | Martin et al. |

FOREIGN PATENT DOCUMENTS

| | | |
|---|---|---|
| EP | 0255314 | 7/1987 |
| EP | 0241359 | 10/1987 |
| EP | 0687548 | 12/1995 |
| EP | 0812674 | 12/1997 |
| EP | 2463083 A2 | 11/2011 |
| JP | H01306210 A | 12/1989 |
| JP | H03231817 A | 10/1991 |
| JP | H0768580 A | 3/1995 |
| JP | H09267344 A | 10/1997 |
| JP | 2004291265 A | 10/2004 |
| JP | 2004358828 A | 12/2004 |
| JP | 2010023466 A | 2/2010 |
| JP | 2011189731 A | 9/2011 |
| JP | 2011218798 A | 11/2011 |

OTHER PUBLICATIONS

Examination Report corresponding to application No. GB1304918.4, dated Mar. 23, 2015.
International Search Report for application No. PCT/EP2013/055575, dated Jun. 13, 2013, 3 pages.
UK Combined Search and Examination Report for corresponding application No. GB1204690.0, dated Jul. 5, 2012, 7 pages.
Written Opinion for application No. PCT/EP2013/055575, dated Jun. 13, 2013, 5 pages.
Japanese Office Action for JP Application No. 2014-561478, dated Aug. 5, 2016, 8 pages.

* cited by examiner

COMPOSITE MOULDING TECHNIQUES

The present invention relates to a composite component and a method of moulding a composite component.

BACKGROUND OF THE INVENTION

It is known to use mould composite components comprising a fibrous substrate and a matrix. The fibrous substrate can comprise synthetic or natural fibres and the matrix can be a plastics material. These techniques are well developed for forming composite panels. Additional fixtures, such as brackets and support members, can be bonded to the composite panel. This bonding process can be performed by locating pre-formed fixtures in the mould when the composite panel is moulded; or they can be bonded in place in a subsequent process. The bonding of fixtures to the composite component is undesirable since it typically adds an additional process step, either before or after the component has been moulded.

The present invention, at least in certain embodiments, sets out to ameliorate or overcome the limitations associated with prior art moulding techniques.

SUMMARY OF THE INVENTION

Aspects of the present invention relate to a composite component and a method of moulding a composite component as defined in the appended claims.

In a further aspect, the present invention relates to a method of moulding a component having at least one feature, the method comprising:
locating at least one fibrous substrate in a mould; and
providing a matrix-forming material in the mould;
wherein the method further comprises applying heat to melt the matrix-forming material to form a matrix and to integrally mould said at least one feature.

The matrix-forming material melts and the molten material can flow within the mould. The molten material can penetrate each fibrous substrate to form the matrix. Moreover, the molten material can flow into apertures, recesses or detents formed in the mould to integrally mould said at least one feature. The at least one integrally moulded feature is formed from the same source material as the matrix. The matrix and the at least one feature are thereby unified. It is not necessary for the fibrous substrate to extend into said apertures in the mould. Consequently, the at least one feature can be formed partially or substantially completely from the matrix-forming material.

The at least one feature can be defined on a surface of the component. The at least one feature can be a projection or protuberance. The at least one feature can be a bracket, a spigot, a flange, a rib or the like extending outwardly from a surface of the component. The method according to the present invention enables integral features to be formed in a single process cycle. The resulting composite component can comprise at least one feature moulded integrally from the matrix-forming material.

The at least one fibrous substrate can comprise a single continuous fibre or a plurality of fibres.

The method can comprise locating a plurality of fibrous substrates in the mould. A second fibrous substrate can be located in the mould. The fibrous substrates can partially or completely overlap each other. The fibrous substrates can each comprise a plurality of fibres. The fibres in the fibrous substrates can be aligned with each other or can be angularly offset from each other. The matrix-forming material can be provided in the mould between the fibrous substrates. The material can thereby form a flowable core. When the matrix-forming material is melted, the molten material can flow outwardly through the fibrous substrates. The method can comprise forming alternate layers of fibrous substrate and matrix-forming material in the mould.

The matrix-forming material can be positioned adjacent the at least one fibrous substrate in the mould.

The at least one fibrous substrate can comprise one or more reinforcing fibres. The molten material can thereby penetrate between the fibres in the substrate to form the matrix. The fibres can be short or long fibres. The fibres could be synthetic, for example glass or carbon fibres. Alternatively, the fibres can be natural fibres, such as cotton, wool, flax, hemp, bamboo, jute, sisal, kenaf etc. A combination of different fibres, for example natural fibres and synthetic fibres, could be used to provide different material properties. The at least one fibrous substrate can comprise a continuous fibre, for example formed into a layer or wound onto a mandrel.

The matrix-forming material can be a plastics material. For example, the matrix-forming material can be a thermoset or thermoplastic material. The matrix-forming material can be a polymer, such as polyamide (nylon), polyvinylchloride (PVC), polystyrene, polyethylene, polypropylene and polyacrylonitrile. The matrix-forming material can also be a copolymer, such as acrylonitrile butadiene styrene (ABS). The matrix-forming material can be a resin or adhesive such as epoxy, melamine, or silicone.

The fibres in at least one fibrous substrate can be substantially aligned with each other. For example, the fibres could be substantially parallel to each other. The fibres can be formed into a thread or yarn. The at least one fibrous substrate can be formed by weaving said thread or yarn. The fibres could be spun into the thread or yarn. The fibres within the thread or yarn can be arranged substantially parallel to each other, for example using a wrap spun yarn.

The at least one fibrous substrate can comprise threads or yarns arranged substantially parallel to each other. The at least one fibrous substrate could be elongate, for example in the form of a strip. Several strips could be interlaced to form the at least one fibrous substrate.

The at least one fibrous substrate could consist of reinforcing fibres. Alternatively, the at least one fibrous substrate can further comprise matrix-forming fibres. The matrix-forming fibres can be made from the same material as the matrix-forming material introduced into the mould or a different (compatible) material. The matrix-forming fibres can also melt when heat is applied. When heated, the matrix-forming fibres and the matrix-forming material can coalesce.

The at least one fibrous substrate can be provided as a flexible sheet, for example made of woven material. Alternatively, the at least one fibrous substrate can be provided as a pre-consolidated sheet. Typically, pressure and heat can be applied to form the pre-consolidated fibrous sheet. A matrix can be provided for retaining the fibres in said pre-consolidated fibrous sheet. The matrix can be formed by matrix-forming fibres interwoven with the reinforcing fibres. The material forming the matrix can be re-melted upon application of heat, thereby allowing the matrix-forming material introduced into the mould to penetrate between the fibres in the at least one fibrous substrate.

The at least one fibrous substrate and the matrix-forming material can be introduced into the mould as separate, discrete layers. The matrix-forming material can be provided in the mould in a pliable or plastic form. For example, the matrix-forming material could have a semisolid composition (i.e. having a viscosity and rigidity intermediate between that of a liquid and a solid). The matrix-forming material could be pre-heated before it is introduced into the mould to provide the desired properties. Pre-heating the matrix-forming material can reduce its viscosity and rigidity and improve its flow characteristics when it is provided in the mould. Similarly, the at least one fibrous substrate could be pre-heated.

Alternatively, the matrix-forming material can be provided in the mould in a solid form. The matrix-forming material could be provided in a granular or powder form. Alternatively, the matrix-forming material can be provided in the form of at least one sheet or ply. The ply can be positioned in the mould adjacent to the fibrous substrate. The matrix-forming material can comprise a filler or bulking material, such as wood fibres. More than one ply can be provided in sections of the mould requiring additional material. The matrix-forming material could be formed into a shape for supporting the at least one fibrous substrate when it is located in the mould.

The mould can comprise first and second mould parts. The at least one fibrous substrate could be cut to size and then located in the mould. Alternatively, the at least one fibrous substrate can be cut to size in the mould. The first and second mould parts can have shearing edges for cutting the at least one fibrous substrate.

As outlined above, the molten matrix-forming material can integrally form at least one feature on the component. The at least one feature can be formed contemporaneously with the formation of the matrix in a single process cycle. Apertures and/or recesses can be formed in said first mould part and/or said second mould part to form one or more features in the component. At least one sprue can be in fluid communication with said one or more features. The sprue can allow molten matrix-forming material to exit the mould during the method. The method can comprise providing sufficient matrix-forming material in the mould to form the matrix and said at least one feature.

The method can comprise applying pressure to compress the material within the mould. The application of pressure can promote the flow of the molten matrix-forming material within said mould. For example, the application of pressure can force the molten matrix-forming material between the fibres and/or into recesses formed in the mould.

It will be appreciated that the method according to the present invention could be employed in a variety of moulding techniques, including: vacuum moulding or compression moulding.

In a further aspect, the present invention relates to a method of moulding a component, the method comprising:
  locating at least one fibrous substrate in a mould; and
  providing a matrix-forming material in the mould, the matrix-forming material being provided coincident with at least a portion of the at least one fibrous substrate;
  wherein the method further comprises applying heat to melt the matrix-forming material to form a matrix around the at least one fibrous substrate. The matrix can penetrate the at least one fibrous substrate surrounding the fibre(s) in the fibrous substrate.

The matrix-forming material can be provided in the mould in a form which is either solid or semisolid (i.e. having a viscosity and rigidity intermediate between that of a liquid and a solid). The matrix-forming material can, for example, be heated to reduce its viscosity and rigidity. The matrix-forming material can be pre-heated to improve its flow characteristics when it is provided in the mould.

This technique is suitable for forming components having at least one integral feature, such as a projection or protuberance. The features are formed from the matrix-forming material provided in the mould. The matrix-forming material forms a matrix around the fibre(s) in said the at least one substrate and also forms said at least one integral feature. The matrix and said at least one integral feature are moulded concurrently. The matrix-forming material can be provided in the mould in a layer or ply. The layer or ply can be rigid or semi-rigid. The at least one fibrous substrate can be in a rigid or semi-rigid form.

In a still further aspect, the present invention relates to a moulded component comprising:
  at least one fibrous substrate; and
  a matrix;
  wherein the component further comprises at least one integrally moulded feature formed contemporaneously with the matrix from the same material. The at least one integrally moulded feature is formed from the same source material as the matrix. The moulded feature can be formed substantially completely from the material which forms the matrix. The matrix and the moulded feature can have a unified, integral structure. The composite component can be formed using the method(s) described herein.

The at least one fibrous substrate can comprise one or more fibres. The moulded feature can, for example, define a bracket, a spigot, a flange, a ridge or a rib. The moulded feature can extend away from the at least one fibrous substrate. The moulded feature can be formed at least substantially completely from said matrix material. During the moulding process, the matrix material flows into a recess formed in the mould to form the moulded feature. The formation of the moulded feature occurs contemporaneously with the formation of the matrix. The fibres provided in the at least one fibrous substrate can be provided in a layer and arranged so as not to extend into the moulded feature. The component can comprise a plurality of said integrally moulded features.

The fibres can be natural fibres and/or synthetic fibres.

BRIEF DESCRIPTION OF THE DRAWINGS

An embodiment of the present invention will now be described, by way of example only, with reference to the accompanying figures, in which.

DETAILED DESCRIPTION

Detailed descriptions of specific embodiments of a method of moulding a component according to the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the method of moulding a component described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
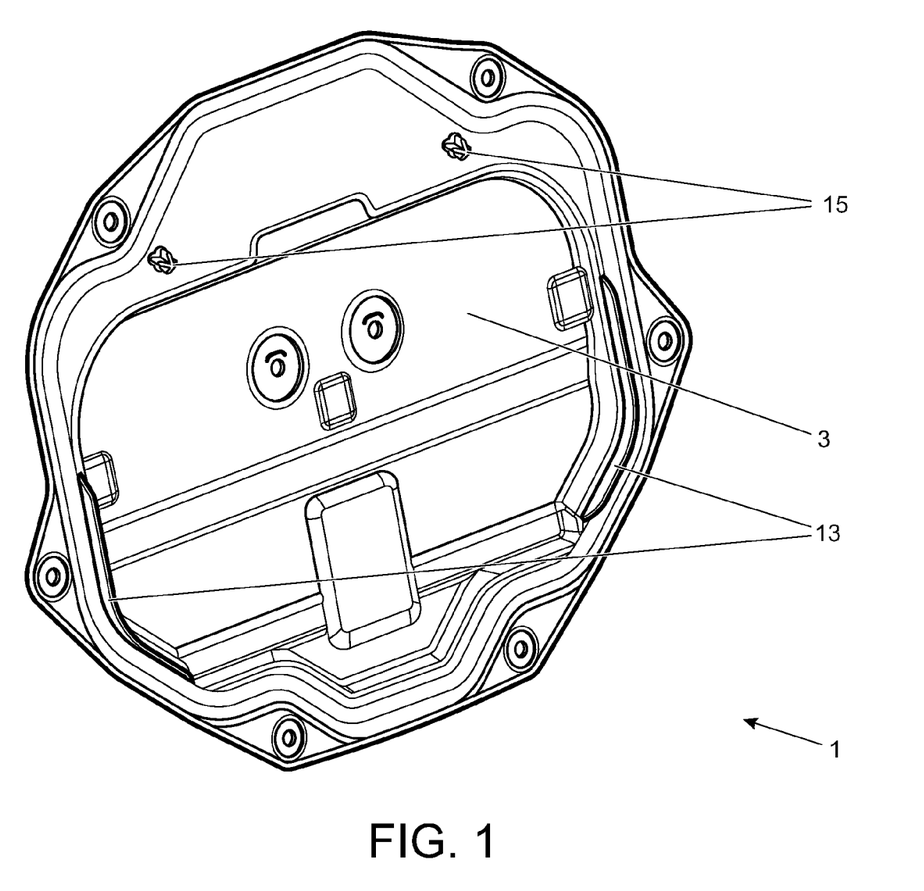
FIG. 1 shows a front perspective view of a moulded composite component formed using the method according to the present invention.
Figure 2:
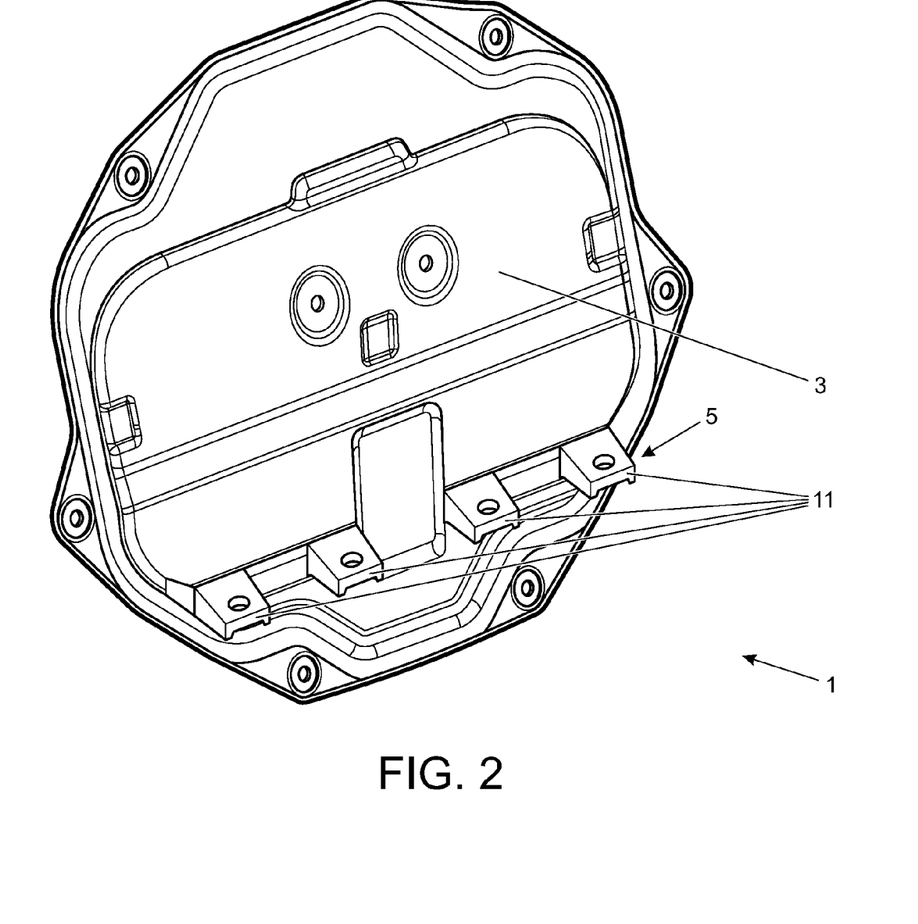
FIG. 2 shows a rear perspective view of the composite component shown in FIG. 1.
Figure 3:
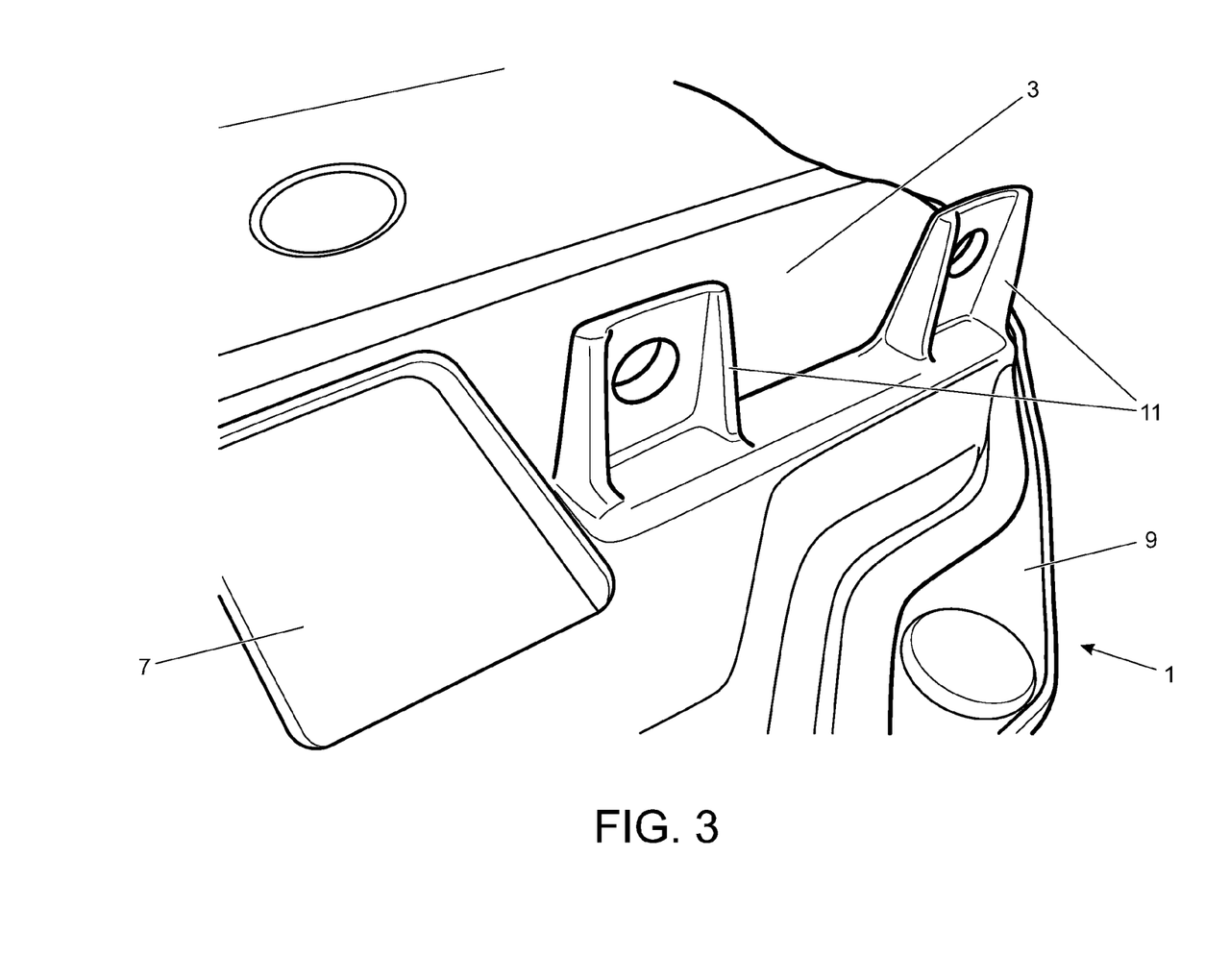
FIGS. 3 and 4 are images of the moulded composite component shown in FIGS. 1 and 2.
Figure 4:
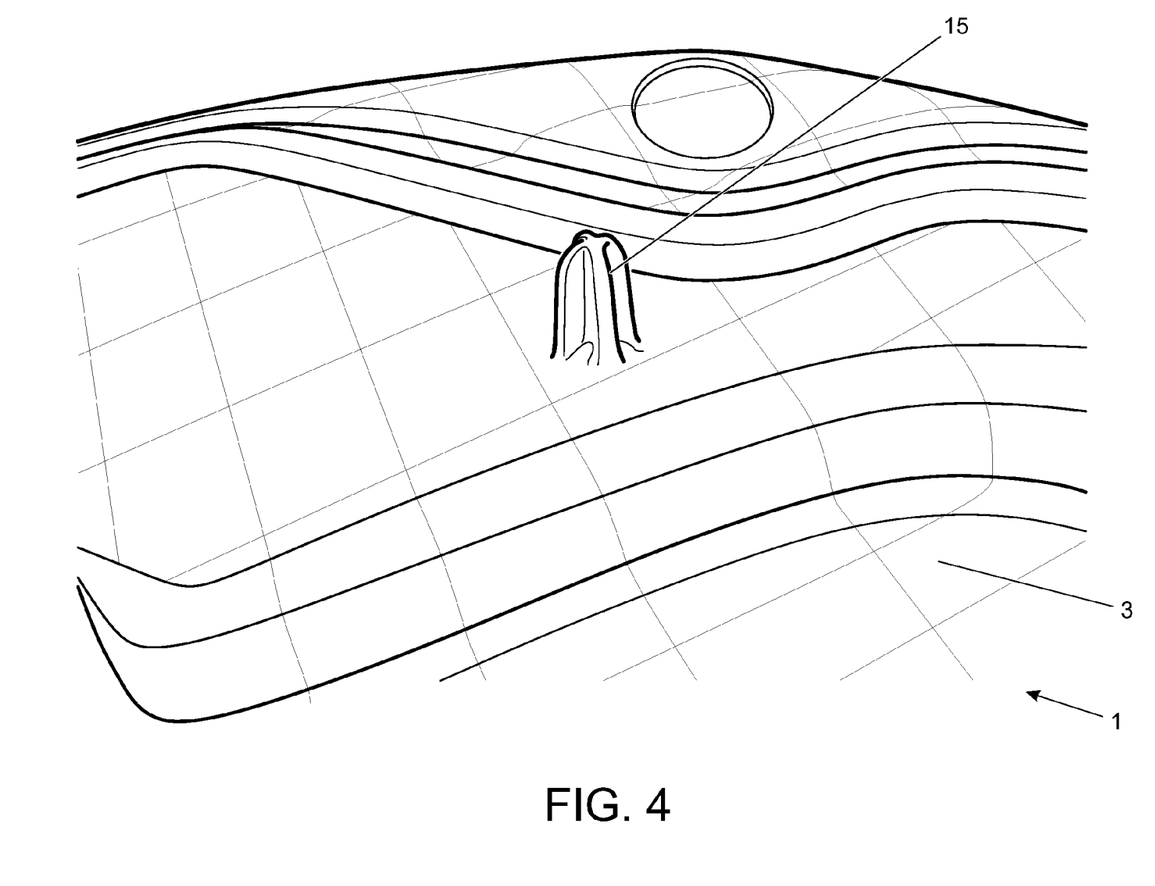

A method of moulding, in particular compression moulding, a composite component 1 in accordance with the present invention will now be described. FIGS. 1 and 2 show perspective views of the component 1; and images showing portions of the moulded component 1 are shown in FIGS. 3 and 4.

As shown in FIGS. 1 and 2, the component 1 is semi-structural member for mounting on an interior of a motor vehicle door. The component 1 comprises a panel section 3 having a plurality of integrally moulded features (denoted generally herein by the reference numeral 5). The component 1 is formed from a fibrous substrate 7 held in a solid matrix 9. As shown in FIGS. 3 and 4, the features 5 are integrally moulded from the material which forms the matrix 9 in a single, contemporaneous process step. Detents and recesses can be formed in the panel section 3. In the present embodiment, the features 5 include (four) mounting brackets 11, (two) flanges 13, and (two) locating spigots 15. The features 5 could also include reinforcing ribs, ridges, bushes and the like.

Figure 5A:
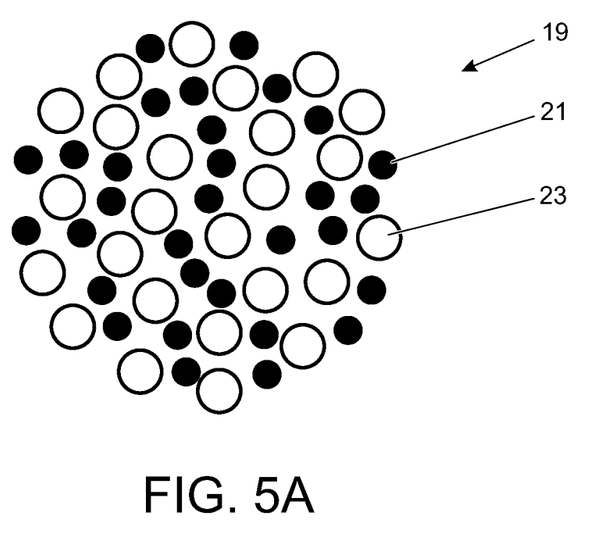
FIGS. 5A and 5B show enlarged views of a yarn for forming the fibrous substrate used in the method according to the present invention.
Figure 5B:
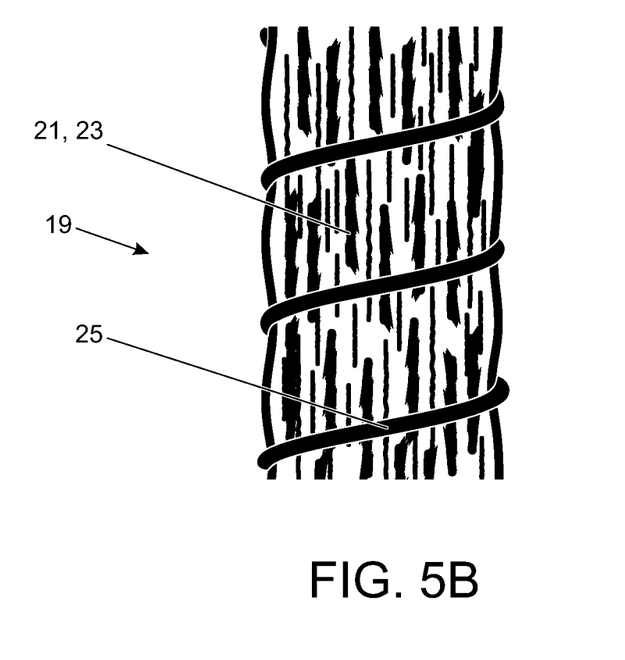

The substrate 3 in the moulded component 1 comprises two layers of fabric 17 each woven from a yarn 19. The yarn 19 is formed from a plurality of natural fibres 21 (such as flax) interspersed with thermoplastic, e.g. polypropylene polyester or polyamide, matrix-forming fibres 23, as shown in the cross-sectional view in FIG. 5A. To preserve the longitudinal strength of the natural fibres 21, the yarn 19 is wrap spun by supporting a central aggregate of natural fibres 21 and thermoplastic (e.g. polypropylene) fibres 23 inside a helically-wound outer fibre 25, as shown in FIG. 5B. The yarn 19 is woven to form each layer of fabric 17 in conventional manner and different weaving patterns can be employed to provide different mechanical properties in the substrate 3.

The thermoplastic fibres 23 are provided in the yarn 19 to enable the layer of fabric 17 to be consolidated into a fibrous sheet 27 (i.e. a sheet containing fibres). In particular, heating the layer of woven fabric 17 causes the polypropylene fibres 23 to melt and bond the natural fibres 21 together thus forming a matrix. The application of pressure allows the layer of fabric 17 to be formed into the fibrous sheet 27. The distribution and alignment of natural fibres 21 in the fibrous sheet 27 is substantially uniform. Moreover, the fibrous sheet 27 is resilient and can be readily handled.

The features 5, and all or part of the matrix 9, are formed from a feature-forming material comprising polypropylene and optionally a filler material, such as wood fibre or pulp. This material can, for example, be that which is supplied under the trade name Arbofill by TECNARO GmbH of Burgweg 5, D 74360 Ilsfeld-Auenstein, Germany. To facilitate handling, the feature-forming material in the present embodiment is supplied as a continuous feature-forming sheet 29. However, the sheet may be discontinuous as described below.

The moulding process according to the present invention will now be described with reference to FIG. 6. The component 1 is formed in a compression mould comprising first and second cooperating mould parts 33, 31 each having profiled surfaces to define the component 1. Recesses (denoted generally by the reference numeral 35) are formed in the surfaces of the first and/or second mould parts 33, 31 to define the features 5.

First and second fibrous sheets 27a, 27b and a feature-forming sheet 29 are positioned between the first and second mould parts 33, 31. The feature-forming sheet 29 is provided between the first and second fibrous sheets 27a, 27b to form a core. The first and second fibrous sheets 27a, 27b and the feature-forming sheet 29 can optionally be pre-heated before they are introduced into the mould.

Figure 6:
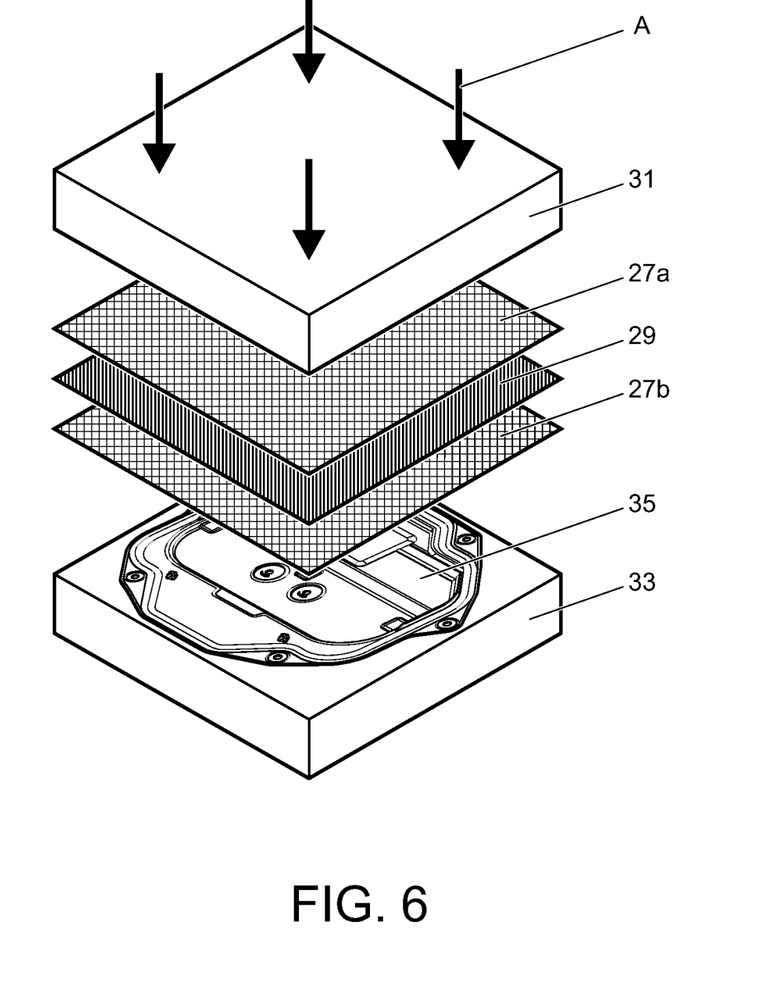
FIG. 6 shows a schematic representation of the lay-up arrangement for moulding the composite component.

The first and second mould parts 33, 31 are brought together to compress the first and second fibrous sheets 27a, 27b and the feature-forming sheet 29, as illustrated by the arrows A in FIG. 6. The first and second mould parts 33, 31 have shearing edges which trim the fibrous sheets 27a, 27b and the sheet 29 to the required size when the mould is closed. The edge(s) of the fibrous sheets 27a, 27b could be held between the first and second mould parts 33, 31 to maintain the fibrous sheets 27a, 27b in position within the mould. The first and second fibrous sheets 27a, 27b conform to the profile of the first and second mould parts 33, 31, for example to form detents and ridges in the component 1. The mould is heated to reduce the viscosity of the matrix-forming material in the feature-forming material sufficiently to enable it to penetrate between the natural fibres 21 in the woven fabric 17 and flow into the recesses 35 in the first and/or second mould parts 33, 31. In the present embodiment the mould is heated to 180-200° C. to melt the polypropylene, but different temperature ranges may be suitable for different materials. By applying pressure to the first and second mould parts 33, 31, the flow of the molten polypropylene within the mould is promoted.

The molten polypropylene impregnates the woven fabric 17 and flows into the recesses 35 formed in the surfaces of the first and second mould parts 33, 31. The polypropylene of the feature-forming material thereby forms the features 5 in a single process step. The filler material contained in the feature-forming sheet 29 can pass between the fibres in the woven fabric 17 and thereby travel through the first and second fibrous sheets 27a, 27b into the recesses 35. The flow of molten polypropylene within the mould thereby forms the features 5 integrally with the rest of the component 1 in a single process step. It is noted that the feature-forming material may be provided to aid formation of the matrix encapsulating the fibres of the fibrous substrate. Equally, some of the thermoplastic fibres in the fibrous substrate may move, during moulding, into the recesses and thus, in-part, form the features.

The first and second mould parts 33, 31 are cooled and the moulded component 1 is removed. As shown in FIGS. 3 and 4, the mounting brackets 11 and the locating spigots 15 are formed integrally with the rest of the component 1. In the present embodiment, the features 5 are moulded at least substantially completely from polypropylene with a relatively small degree of penetration of the natural fibres 21. To provide further reinforcement for the features 5, additional natural fibres 21 could be provided proximal some or all of the recesses 35 in the first and second mould parts 33, 31.

If necessary, the component 1 can be trimmed to remove excess material after it has been removed from the mould. For example, the component 1 can be trimmed to remove one or more sprues (not shown) provided in the first and/or second mould parts 33, 31 to enable excess polypropylene to be removed during the moulding process. In another example, the component may be trimmed to remove flashes (not shown).

The present embodiment has been described with reference to pre-consolidated fibrous sheets 27a, 27b, but it will be appreciated that it is not essential that the woven fabric 17 is pre-consolidated. Rather, the woven fabric 17 could be introduced directly into the mould as a flexible material. This approach may, for example, be appropriate for mould parts having a larger draw. Similarly, it is not essential that the matrix-forming material is introduced into the mould in the form of a pre-consolidated fibrous sheet 27. For example, the matrix-forming material could be provided in a granular or powder form.

To provide a smoother finish on the component 1, a surface film could be provided in the first and/or second mould parts 33, 31. The surface film could, for example, be provided on a surface of the component 1 which will be exposed in use (referred to as an A-surface).

Figure 7:
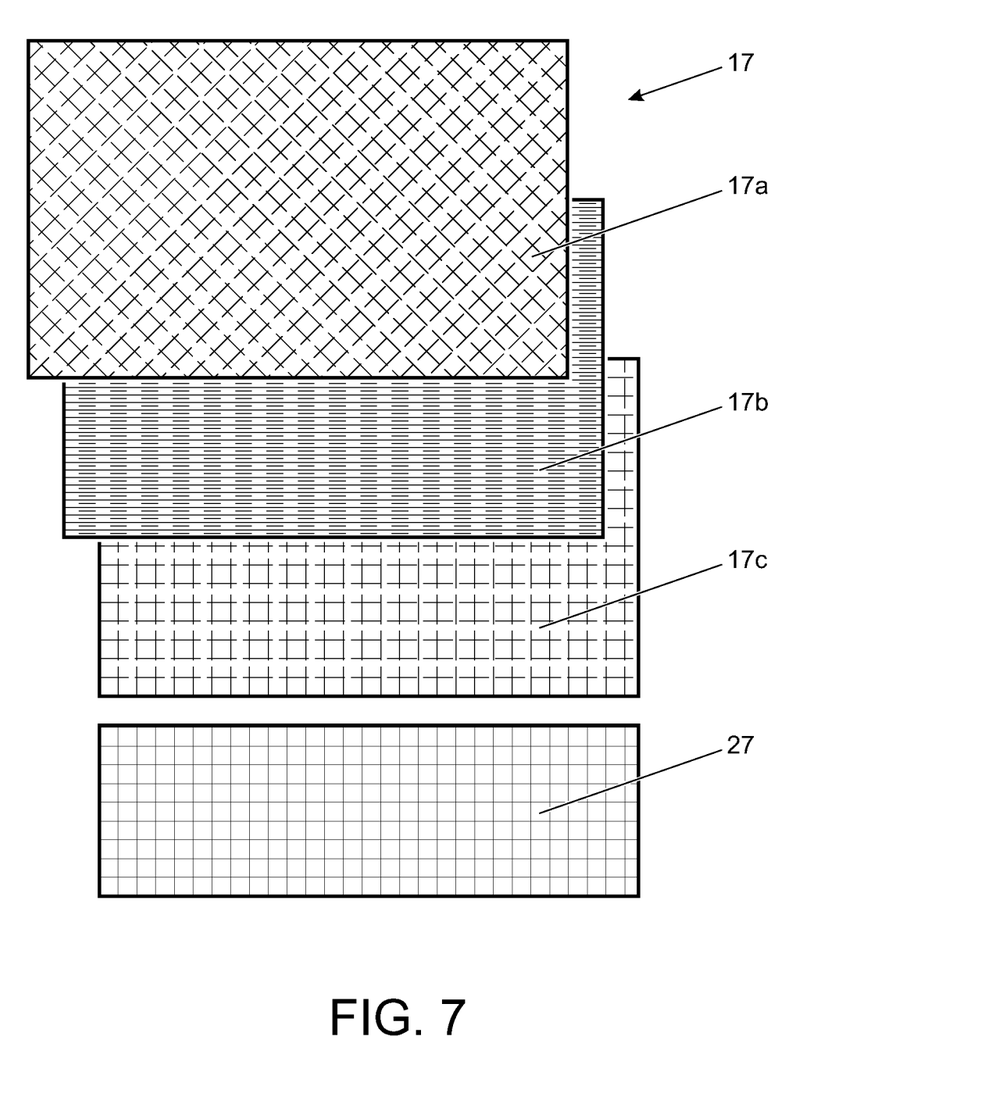
FIG. 7 shows sample woven materials that can be used in accordance with the present invention.

As mentioned above, the yarn 19 can be woven in different patterns to form the fabric 17. By way of example, three different samples of fabric 17a, 17b, 17c having different weaving patterns are shown in FIG. 7 alongside a pre-consolidated fibrous sheet 27. The different weave patterns arrange the natural fibres 21 in different orientations which can provide different mechanical properties in the moulded component 1.

Furthermore, the angular orientation of the first and second fibrous sheets 27a, 27b within the mould can be offset to alter the mechanical properties of the moulded component 1. The pre-consolidated fibrous sheet 27 could be formed from more than one layer of fabric 17. The layers of fabric 17 could be aligned or angularly offset from each other. Different types of fibres could be used in different layers of fabric 17 or different fibrous sheets 27.

Rather than use a woven fabric 17, an elongate tape consisting of aligned natural fibres 21 and/or synthetic fibres 23 could be used. The tape can be woven and optionally pre-consolidated in the same as the fabric 17.

It will be appreciated that various changes and modifications can be made to the embodiment described herein without departing from the scope of the present invention.

The invention has been described with reference to a woven fabric 17 having a uniform distribution of natural fibres 21. However, a non-uniform distribution of natural fibres 21 could be employed. The fabric 17 could be woven with a non-uniform distribution to provide localised reinforcement. Indeed, three dimensional weaving could be employed to provide enhanced material properties.

The matrix-forming material can be provided in a variety of forms, for example powder, granules and sheet(s). Furthermore, a non-uniform distribution of matrix-forming material can be provided in the mould. For example, additional matrix-forming material can be provided proximal recesses 35 in the mould to form the features 5.

The present invention has been described with reference to compression moulding techniques. Compression moulding techniques may be in the form of using the first mould part 33 and a second mould part 31. In view of the above description, the second mould part 31 may apply pressure (via arrows A) to the components to be moulded against the first mould part 33. The second mould part 31 may therefore be replaced by a bag whereby a vacuum compression method is used to compress the bag onto the components 27a, 27b, 29 and into the first mould part 31. It is noted that the present invention could be employed in other moulding processes, for example blow moulding or vacuum forming.

Although the present invention has been described with particular reference to natural fibres, it will be appreciated that it could be implemented using synthetic fibres, such as glass fibres, carbon fibres or aramid fibres. Indeed in another embodiment of the present invention, the fibrous substrates 27a, 27b are formed using carbon fibre, and in particular recycled carbon fibres. Recycled carbon fibres may be retrieved from offcuts of other known carbon fibre moulding processes and the resulting components. The recycled fibres are combed to achieve substantially aligned long fibres, which are combined with thermoplastic (matrix-forming) fibres (for example, polypropylene, polyester or polyamide) into a fabric or tape as mentioned above. The long carbon fibres are substantially aligned and optionally woven into a substantially perpendicular weave, thus giving the resulting component excellent strength properties in its planar configuration, i.e. across the component.

In this example, the feature-forming material 29 also optionally comprises synthetic fibres. In one embodiment the feature-forming material comprises short carbon fibres that are preferably recycled carbon fibres. The short nature of the fibres in the feature-forming material permits egress of the short fibres through the long fibres of the fibrous substrate and into the recesses of the mould part so as to form the features. This has the advantage of providing strength to the feature.

Components formed using synthetic materials may be suited to external applications, i.e. those applications which are subject to moisture and gas and should be impermeable to one or both. For example, the method may be used to form exhaust ducts, aerofoils, car panels, etc.

Figure 8:
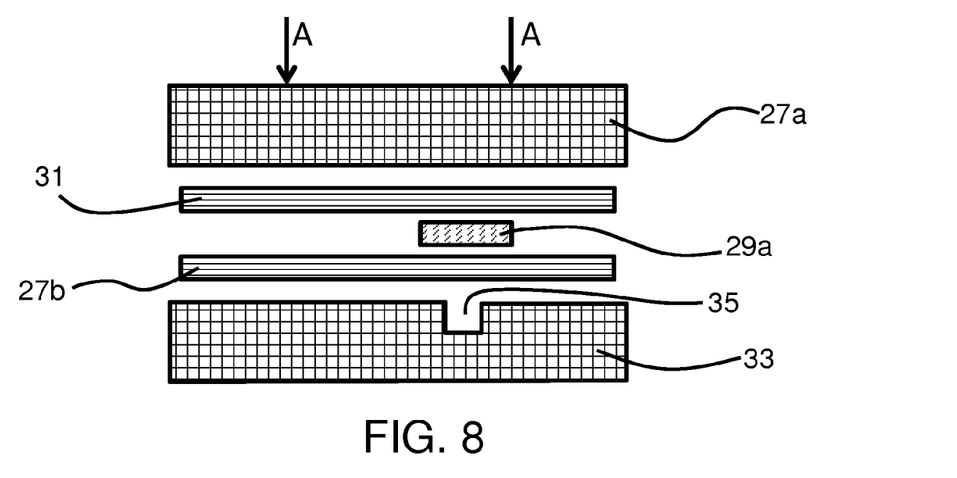
FIG. 8 shows a schematic representation of the lay-up arrangement for moulding the composite component.
Figure 9:
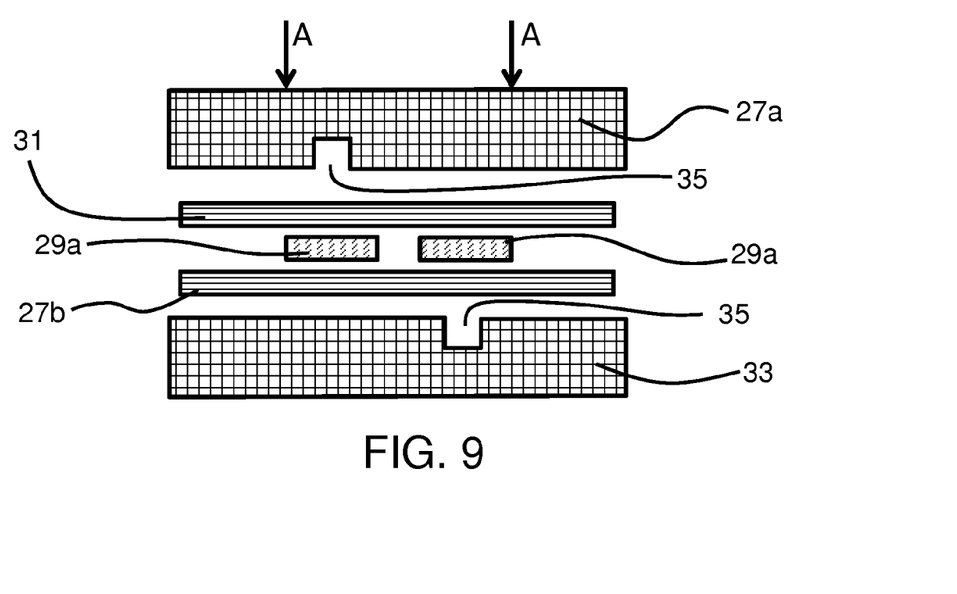
FIG. 9 shows a schematic representation of the lay-up arrangement for moulding the composite component.

As shown in FIG. 8, in a further embodiment of the present invention, the feature forming material 29a may be provided only over the region of the mould part where there is a recess 35 and indeed, a feature is to be formed. This is possible because the matrix-forming fibres in the fibrous substrates fuse during moulding to form a matrix. Therefore, this embodiment further reduces the weight of the component produced by the method because only the feature is formed from the feature-forming material. With reference to FIG. 9, it is noted that the second mould part 31, as described above, may be provided with at least one recess 35. In this example, a section of feature forming material 29a is positioned over the recess 35. As the mould closes, e.g. as the second mould part 31 is moved toward the first mould part 33, the feature forming material 29a flows into the recess 35. Preferably, the volume of feature forming material 29a provided is substantially equivalent to the volume of the recess and indeed, the feature to be formed.

Figure 10:
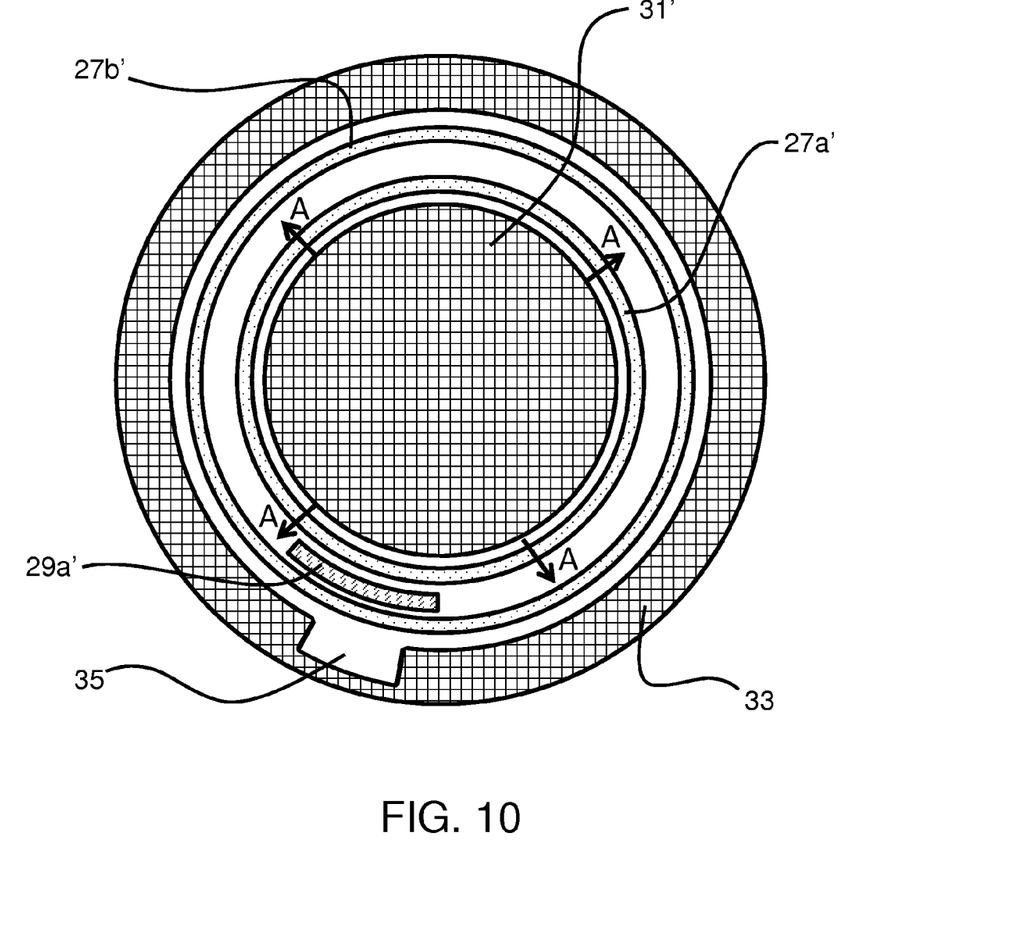
FIG. 10 shows a schematic representation of the lay-up arrangement for moulding the composite component.
Figure 11:
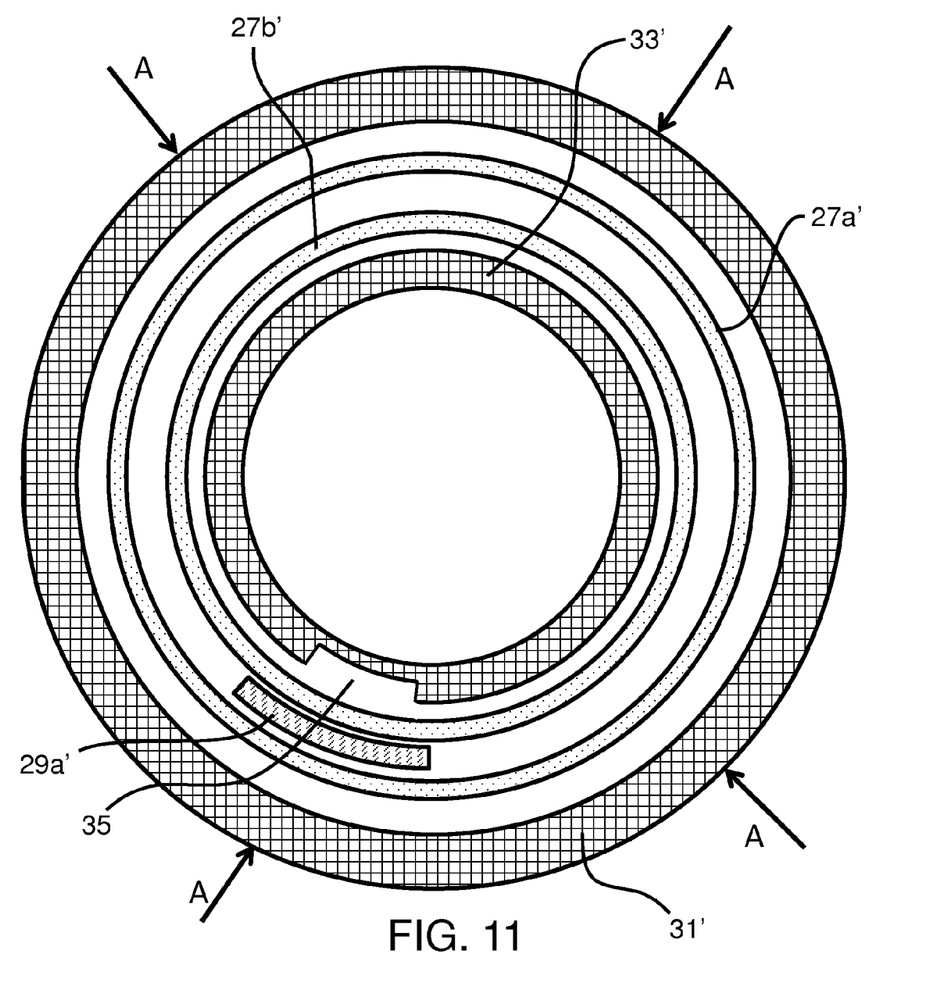
FIG. 11 shows a schematic representation of the lay-up arrangement for moulding the composite component.

With reference to FIGS. 10 and 11, in another embodiment of the method according to the present invention, the method of moulding takes the form of the first mould part 33' being a cylindrical mould whereby the moulding components 27a', 27b' and 29a', are placed inside or outside the cylinder (see 33' FIG. 10 and 33' FIG. 11, respectively). In the embodiment where the components are placed inside the cylinder (FIG. 10), a second mould part 31' in the form of a mandrel is drawn through the cylinder to provide a force in the A direction to promote formation of the matrix and flow of the feature-forming material 29a' into recesses 35' positioned on the inside surface of the first mould part 33' so as to form features. It should be noted that the mandrel is schematically shown to have a smaller diameter than the first mould part. The diameter may be smaller for a leading edge of the mandrel (with respect to its drawn direction) but to exert force, the mandrel diameter is substantially equal to the internal diameter of the first mould part less the thickness of the moulding components 27a', 27b'. In the embodiment where the moulding components are placed outside of the cylinder (FIG. 11), a second mould part 31' in the form of a cylindrical bag or the like is placed around/over the moulding components 27a', 29a' and 27b', and the first mould part 33'. Inflation of the bag or withdrawal of air between the bag and the moulding components applies pressure in the A direction to the moulding components to promote formation of the matrix and flow of the feature-forming material 29a' into recesses 35 positioned on the outside surface of the first mould part 33' so as to form features. As with the foregoing embodiments, it should be noted that the feature forming material 29a' in FIGS. 10 and 11 may be provided in the form of a continuous sheet around the mould. Components produced by these methods may be used, for example, in exhaust ducts or the like, where tubular structures are required and integrally moulded features provide for those tubular structures to be strong and lightweight.

The invention claimed is:

1. A method of molding a component having at least one feature, the method comprising:
    locating a first fibrous substrate in a mold, the mold including two recesses and the first fibrous substrate comprising a substrate matrix-forming material and a plurality of fibers;
    providing a feature-forming material in the mold, the feature forming material comprising a feature matrix-forming material;
    locating, in the mold, a second fibrous substrate at least partially overlapping the first fibrous substrate, wherein the feature-forming material is provided between the first and second fibrous substrates to form a core; and
    applying pressure to combine the first and second fibrous substrates and feature matrix-forming material to form a matrix and to integrally mold the at least one feature,
    wherein the mold comprises a first mold part comprising at least one of said recesses, whereby at least the feature matrix-forming material flows through one of the first and second fibrous substrates before flowing into the at least one recess during the application of pressure, and further wherein the feature matrix-forming material is provided as two or more discrete portions of material, each of said two or more discrete portions being positioned in the mold adjacent to a respective one of the recesses, and
    the feature-forming material forming the core between the first and second fibrous substrates further comprising a plurality of short fibers, wherein the short fibers are shorter than the plurality of fibers in the first fibrous substrate.

2. A method as claimed in claim 1, wherein the first and second fibrous substrates each comprises a plurality of fibers woven to form a sheet; and/or each fibrous substrate comprises a plurality of fibers arranged to form a uni-directional tape.

3. A method as claimed in claim 2, wherein said substrate matrix-forming material is the same material as the feature matrix-forming material.

4. A method as claimed in claim 1, wherein each of the first and second fibrous substrates is provided as a pre-consolidated sheet member.

5. A method as claimed in claim 1, wherein said feature-forming material is provided in the form of at least one ply.

6. A method as claimed in claim 1, wherein said feature-forming material is provided in the mold in a solid or a semisolid form.

7. A method as claimed in claim 1, wherein said feature-forming material comprises a polymer.

8. A method as claimed in claim 1, wherein the mold comprises a second mold part and wherein the pressure is applied by the second mold part.

9. A method as claimed in claim 1, wherein the pressure is applied by a vacuum bag.

10. A method as claimed in claim 8, wherein the second mold part comprises at least one recess, whereby at least the feature-forming material flows into the at least one recess.

11. A method as claimed in claim 8, further comprising cutting each fibrous substrate to size by closing the first and second mold parts.

12. A method as claimed in claim 1 further comprising the step of applying heat to melt the first and second substrates and/or feature matrix-forming fibers before or during the application of pressure.

13. A method as claimed in claim 1, wherein the plurality of fibers in the first fibrous substrate are natural or synthetic fibers.

14. A method as claimed in claim 1, wherein each of the plurality of short fibers in the feature-forming material are natural or synthetic fibers.

15. A method as claimed in claim 13, wherein the fibers are carbon fibers.

16. A method as claimed in claim 1, wherein the feature-forming material is provided in a quantity equivalent to the volume of the at least one recess.

\* \* \* \* \*